United States Patent
Islam (10) Patent No.: US 8,220,158 B2
(45) Date of Patent: Jul. 17, 2012

(54) COAXIAL CABLE END PREPARATION TOOL WITH SAW GUIDE AND ASSOCIATED METHODS

(75) Inventor: Nahid Islam, Westmont, IL (US)

(73) Assignee: Andrew LLC, Hickory, NC (US)

( * ) Notice: Subject to any disclaimer, the term of this patent is extended or adjusted under 35 U.S.C. 154(b) by 910 days.

(21) Appl. No.: 12/256,617

(22) Filed: Oct. 23, 2008

(65) Prior Publication Data

US 2010/0101373 A1    Apr. 29, 2010

(51) Int. Cl.
*B26B 29/00*    (2006.01)
*H02G 1/12*    (2006.01)

(52) U.S. Cl. ............... 30/90.2; 30/92; 30/289; 81/9.4; 29/867

(58) Field of Classification Search ............. 30/90.2, 30/92, 289, 1, 90.3, 96, 286, 95, 93, 99–102, 30/300, 329, 2; D8/41, 14, 20, 95–100; 401/152, 401/197, 208, 219, 220; 82/47, 100; 15/104.4, 15/104.3, 105; 81/9.4; 29/867
See application file for complete search history.

(56) References Cited

U.S. PATENT DOCUMENTS

| | | | | |
|---|---|---|---|---|
| 3,010,205 A | * | 11/1961 | Pearl | 30/91.2 |
| 3,781,987 A | * | 1/1974 | Gentscheff | 30/2 |
| 4,038,746 A | * | 8/1977 | Bromley | 30/2 |
| 4,078,304 A | * | 3/1978 | Netzel | 30/101 |
| 4,333,234 A | * | 6/1982 | Smith et al. | 30/2 |
| 4,731,928 A | * | 3/1988 | Jackson | 30/90.2 |
| 4,799,406 A | * | 1/1989 | Diaz-De-Guerenu-Aguirrebeitia | 81/9.4 |
| 4,831,732 A | * | 5/1989 | Garton | 30/101 |
| 6,154,963 A | | 12/2000 | Kooiman | 30/90.2 |
| 6,668,459 B2 | | 12/2003 | Henningsen | 30/90.2 |
| 7,007,391 B2 | | 3/2006 | Stoick et al. | 30/101 |
| 7,174,642 B2 | | 2/2007 | Diggle, III et al. | 30/372 |
| D556,528 S | | 12/2007 | Huang | D8/60 |
| 2002/0108253 A1 | | 8/2002 | Losinger | 30/90.1 |

FOREIGN PATENT DOCUMENTS

| | | |
|---|---|---|
| CH | 681754 | 5/1993 |
| DE | 19910068 | 10/2000 |
| EP | 1045494 | 10/2000 |

* cited by examiner

*Primary Examiner* — Ghassem Alie (74) *Attorney, Agent, or Firm* — Allen, Dyer, Doppelt, Milbrath & Gilchrist, P.A.

(57) ABSTRACT

A cable end preparation tool is for a coaxial cable and has a C-shaped body with an opening therein to receive the coaxial cable and a side defining a saw guide to receive a saw blade thereagainst. The C-shaped body includes a gripping rib to fit in a valley of a corrugated outer conductor when the coaxial cable is in the opening. At least one stabilizing rib is adjacent the gripping rib to receive a crest of the corrugated outer conductor thereagainst when the coaxial cable is in the opening. The C-shaped body also includes a rotation guide feature receives the inner conductor. A cutting blade extends outwardly from the C-shaped body for removing a portion of a dielectric between the inner conductor and the corrugated outer conductor as the C-shaped body is rotated about the rotation guide feature.

18 Claims, 9 Drawing Sheets

COAXIAL CABLE END PREPARATION TOOL WITH SAW GUIDE AND ASSOCIATED METHODS

FIELD OF THE INVENTION

The present invention relates to the field of tools for the preparation of cable ends, and, more particularly, to tools for the preparation of coaxial cable ends and related methods.

BACKGROUND OF THE INVENTION

Coaxial cables are widely used to carry high frequency electrical signals. Coaxial cables enjoy a relatively high bandwidth, low signal losses, are mechanically robust, and are relatively low cost. One particularly advantageous use of a coaxial cable is for connecting electronics at a cellular or wireless base station to an antenna mounted at the top of a nearby antenna tower. For example, the transmitter located in an equipment shelter may be connected to a transmit antenna supported by the antenna tower. Similarly, the receiver is also connected to its associated receiver antenna by a coaxial cable path.

A typical installation includes a relatively large diameter coaxial cable extending between the equipment shelter and the top of the antenna tower to thereby reduce signal losses. Some coaxial cables include a smooth outer conductor while other coaxial cables instead have a corrugated outer conductor. These coaxial cables also have an inner conductor and a dielectric between the outer conductor and the inner conductor. Some inner conductors are hollow, while other inner conductors are formed around an inner conductor dielectric core.

A typical connector for such a coaxial cable includes a connector housing to make an electrical connection to the outer conductor and a center contact to make electrical connection to the inner conductor of the coaxial cable. Such a connector may also include a back nut that is positioned onto the end of the outer conductor and adjacent the outer insulating jacket portion of the coaxial cable.

Installation of coaxial cable connectors generally requires that a technician cut and prepare the coaxial cable ends at the appropriate location to mount the connector thereon. In particular, the cable end preparation often requires that the coaxial cable be cut perpendicularly to the longitudinal axis thereof. Further, the cable end preparation often includes removal of the outer jacket to expose a portion of the outer conductor, as well as removal of the dielectric layer between the inner conductor and the outer conductor. However, performing these operations can be difficult given the diameter of some coaxial cables, the precision required, and the fact that such preparations are often done in less than ideal field conditions.

As a result, various cable preparation tools have been developed to make coaxial cable end preparation easier for installation technicians. One such example is set forth in U.S. Pat. No. 6,668,459 to Henningsen. This patent describes stripping tools for coaxial cables with a corrugated outer conductor and a hollow inner conductor. The tool includes three main parts: a jacket cutting part for removing a certain length of the jacket of the cable, a guide part to be placed around the end of the cable after the jacket has been removed by the jacket cutting part, and a second cutting part to be placed on the guide part during a final preparation of the end of the cable during which the inner conductor, the outer conductor and the dielectric material between inner and outer conductor are cut to appropriate lengths. The guide part is provided with a portion for determining a well-defined longitudinal position of the tool on the cable relative to the pattern of valleys and crests of the corrugation on the outer conductor.

Another exemplary cable end preparation tool is disclosed in U.S. Pat. No. 6,154,963 to Kooiman. This patent describes a saw guide for a cable having an annularly corrugated outer conductor. The saw guide includes an inner partially cylindrical surface and a gripping rib extending radially inwardly therefrom. The saw guide further includes a pair of stabilizing members disposed on each side of the gripping rib. Each stabilizing member forms a cutting face that is configured to position a cutting instrument generally orthogonal to the longitudinal axis of the cable.

U.S. Pat. No. 7,174,642 to Diggle, III et al. discloses a cutting guide for a pipe. The cutting guide includes a body portion having a leading edge and an opening therethrough to receive the pipe. The leading edge defines a saw guide to receive a saw thereagainst.

Despite the existence of such cutting tools, further advancements in coaxial cable end preparation tools and methods may be desirable. For example, tools such as those noted above may not each be able to prepare a coaxial cable for use with different types of connectors. Moreover, tools that can be used without the assistance of a power driver, such as a cordless drill, may also be helpful to technicians.

SUMMARY OF THE INVENTION

In view of the foregoing background, it is therefore an object of the present invention to provide a manually operated coaxial cable end preparation tool able to prepare the end of a coaxial cable for use with a variety of different connectors.

This and other objects, features, and advantages in accordance with the present invention are provided by a cable end preparation tool for a coaxial comprising an inner conductor, a dielectric layer surrounding the inner conductor, and a corrugated outer conductor surrounding the dielectric layer. The cable end preparation tool may comprise a C-shaped body having an opening therein to receive the coaxial cable, and may have a side defining a saw guide to receive a saw blade thereagainst. The C-shaped body may comprise a gripping rib to fit in a valley of the corrugated outer conductor when the coaxial cable is in the opening. The C-shaped body may further comprise at least one stabilizing rib adjacent the gripping rib to receive a crest of the corrugated outer conductor thereagainst when the coaxial cable is in the opening.

The gripping rib helps to inhibit longitudinal movement of the cable end preparation tool relative to the coaxial cable. The stabilizing ribs help hold the cable end preparation tool at a 90° orientation with respect to the longitudinal axis of the coaxial cable so that an installer can use the saw guide to make a perpendicular cut, such as at the crest of the coaxial cable.

The cable end preparation tool may have a rotation guide to cooperate with the inner conductor. The rotation guide may comprise a projection extending outwardly from the C-shaped body to be inserted into the inner conductor. Alternatively, the rotation guide may comprise a recess defined in the C-shaped body to receive the inner conductor therein.

Moreover, a cutting blade may extend outwardly from the C-shaped body for removing a portion of the dielectric between the inner conductor and the corrugated outer conductor as the C-shaped body is rotated about the rotation guide. The rotation guide may help positively locate the cable end preparation tool at the end of the coaxial cable. The dielectric material removal with the blade prepares the coaxial cable to receive a connector.

The cutting blade may be carried by a side of the C-shaped body opposite the side defining the saw guide. Alternatively, the C-shaped body may define an outer peripheral surface, and the cutting blade may be carried by the outer peripheral surface. Furthermore, the rotation guide may be a recess defined in the outer peripheral surface and an inner conductor length gage recess may be defined in the C-shaped body.

A saw gage may be carried by the C-shaped body. A cutting guide projection may be carried by the C-shaped body adjacent the cutting blade to receive a radially outer portion of the outer conductor thereagainst as the body is rotated about the rotation guide. This may ensure a uniform cut of the dielectric.

The C-shaped body may further comprise an outer guide ring. The at least one stabilizing rib and the outer guide ring may define parallel surfaces being perpendicular to an axis of the coaxial cable. The C-shaped body may further comprise a saw stop adjacent the outer guide ring.

The opening in the C-shaped body may be a partially circular opening extending more than 180 degrees, for example. The C-shaped body, the gripping rib, the stabilizing rib, the rotation guide, and the cutting blade may be integrally formed as a monolithic unit. This monolithic construction may lower production costs and may increase the speed and ease at which the cable end preparation tool may be increased.

Another aspect is directed to a method of preparing a coaxial cable using a cable end preparation tool as described above. The method includes positioning the coaxial cable in the opening so that the gripping rib fits in a valley of the corrugated outer conductor, and the at least one stabilizing rib receives a crest of the corrugated outer conductor. The coaxial cable is cut using the saw guide. Moreover, the method includes inserting the rotation guide into the inner conductor, and removing a portion of the dielectric between the inner conductor and the corrugated outer conductor with the cutting blade by rotating the C-shaped body about the rotation guide.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternative embodiments.

With reference initially to FIGS. 1-5, a cable end preparation tool 10 for a coaxial cable 30 is now described. The coaxial cable 30 illustratively comprises a hollow inner conductor 35, a dielectric layer 34 surrounding the hollow inner conductor, a corrugated outer conductor 32 surrounding the dielectric layer, and a jacket 31 surrounding the corrugated outer conductor. The jacket 31 has been trimmed away to expose the corrugated outer conductor 32. The inner conductor 35 may also be a tubular inner conductor surrounding a dielectric rod. If the inner conductor 35 is a tubular inner conductor surrounding an inner dielectric rod, a portion of the inner dielectric rod may be removed before preparing the end of the coaxial cable using the cable end preparation tool 10. The jacket 31 is optional.

As will be readily understood by those skilled in the art, the corrugated outer conductor 32 is illustratively an annularly corrugated outer conductor. By annularly corrugated, it is meant that the corrugated outer conductor 32 has a series of annular corrugations forming a series of spaced parallel crests 36 which are discontinuous along the length of the corrugated outer conductor and, similarly, a series of spaced parallel valleys 33 which are also discontinuous along the length of the corrugated outer conductor. That is, each crest 36 and valley 33 extends around the circumference of the corrugated outer conductor 32 once, until it meets itself, and does not continue in the longitudinal direction. Consequently, a transverse cross section taken through the coaxial cable 30 perpendicular to its axis is radially symmetrical. Of course, the coaxial cable 30 may instead have another suitable corrugated outer conductor 32, such as a helical corrugated outer conductor.

The cable end preparation tool 10 illustratively comprises a C-shaped body 12 having an opening 20 to receive the coaxial cable 30. The C-shaped body 12 has a curved shape, although of course the C-shaped body may also have linear portions. The opening 20 illustratively comprises a partially circular opening extending more than 180° around the axis of the coaxial cable 30 when in the opening, although it should be understood that the opening 20 may extend less than 180° around the axis of the coaxial cable in other embodiments.

The C-shaped body 12 comprises a gripping rib 13 that fits in a valley 33 when the coaxial cable 30 is in the opening 20. The gripping rib 13 helps to inhibit longitudinal movement of the cable end preparation tool 10 relative to the coaxial cable 30. The gripping rib 13 illustratively extends more than 180° around the corrugated outer conductor 32 when the cable end preparation tool 10 is installed on the end of the coaxial cable 30. This extension beyond 180° helps to positively lock the cable end preparation tool 10 on the coaxial cable 30 so that the installer may hold and cut the coaxial cable.

To further positively lock the cable end preparation tool 10 on the coaxial cable 30, the inner diameter of the gripping rib 13 may be less than the diameter of a valley 33 of the corrugated outer conductor 32. The cable end preparation tool 10 may be constructed from a resilient material, such as plastic, that may allow the diameter of the gripping rib 13 to elastically expand and contract as the cable end preparation tool 10 is installed on the coaxial cable 30. Alternatively, the cable end preparation tool 10 may be constructed from a rigid material, such as metal, and the coaxial cable 30 may contract and expand as the cable end preparation tool 10 is installed thereon. Of course, those skilled in the art will understand that, in some applications, the diameter of the gripping rib 13 may be greater than the diameter of the valley 33.

The C-shaped body 12 further illustratively comprises a pair of stabilizing ribs 14, 15 on opposing sides of the gripping rib 13. The stabilizing ribs 14, 15 each receive a crest 36 (the crests being on opposite sides of the valley 33) of the corrugated outer conductor 32 thereagainst when the coaxial cable 30 is in the opening 20. The inner diameter of the stabilizing ribs 14, 15 is matched to the outer diameter of the crests 36 of the corrugated outer conductor 32. The stabilizing ribs 14, 15 help stabilize and hold the cable end preparation tool 10 secure at a 90° orientation with respect to the longitudinal axis of the coaxial cable 30. Those skilled in the art will recognize that the C-shaped body 12 need not have a pair of stabilizing ribs 14, 15 and may instead have just one stabilizing rib in some embodiments.

The C-shaped body further illustratively comprises an outer guide ring 19. The stabilizing rib 14 and the outer guide ring 19 define parallel surfaces being perpendicular to the longitudinal axis of the coaxial cable 30. The parallel surfaces of the stabilizing rib 14 and the outer guide ring 19 define a saw guide 25 to receive a saw blade thereagainst. Since the gripping rib 13 and the stabilizing ribs 14, 15 help hold the cable end preparation tool 10 at a 90° orientation with respect to the longitudinal axis of the coaxial cable 30, the saw guide 25 helps enable the installer to make a cut on a crest 36 of the coaxial cable 30 and perpendicular to the axis. The coaxial cable 30 may be cut with a suitable saw, for example a hacksaw blade.

A rotation guide feature 16 is carried by a side of the C-shaped body 12 opposite the side defining the saw guide 25 and extends outwardly therefrom. The rotation guide feature 16 is sized to be inserted into the hollow inner conductor 35.

A cutting blade 17 extends outwardly from the same side of the C-shaped body 12 as the rotation guide feature 16. The cutting blade 17 is for removing a portion of the dielectric 34 between the hollow inner conductor 35 and the corrugated outer conductor 32 as the C-shaped body 12 is rotated about the rotation guide feature 16. Removing the portion of the dielectric 34 may include compressing the foam inward and separating the foam from the outer conductor in addition to cutting away a portion of the foam. Removing a portion of the dielectric 34 helps prepare the coaxial cable 30 for use with a connector, typically so that a portion of the connector may make electrical contact with the inner surface of the corrugated outer conductor 32. The rotation guide feature 16 helps positively locate the cable end preparation tool 10 at the coaxial cable 30 so that the dielectric 34 may be uniformly cut by the cutting blade 17.

Those skilled in the art will appreciate that the cutting blade 17 may also reform the corrugated outer conductor 32 if it has been bent inwardly during cutting of the coaxial cable 30.

A saw gage 18 is illustratively carried by the same side of the C-shaped body 12 as the rotation guide feature 16 and the cutting blade 17. The saw gage 18 may be used after the installer cuts the coaxial cable 30 using the cutting guide 25. To use the cutting gage 18, the cable end preparation tool 10 is removed from the coaxial cable, and replaced on the coaxial cable so that the side of the C-shaped body 12 having the rotation guide feature 16 and the cutting blade 17 is parallel with the end of the coaxial cable. If a portion of the coaxial cable 30 extends beyond the saw gage 18, the coaxial cable has not been cut properly and may be unsuitable for use with some connectors. Therefore, the installer will know to make another cut using the cutting guide 25.

The guide ring 19 is separated from the stabilizing rib 15 by a groove 39. The groove 39 advantageously may assist the manufacturability of the cable end preparation tool 10. More particularly, if the cable end preparation tool 10 is formed by a plastic injection molding process, the groove 39 may allow the injection molding press to evenly cool the molten material used to make the cable end preparation tool. Portions that are further away from the press cool at different rates than portions closer to the press. This may cause a distortion of the part as it cools. The groove 39 divides the cable end preparation tool 10 into portions with generally uniform radial widths. This, the groove 39 may act as a heat sink to help ensure the dimensional accuracy of the cable end preparation tool 10 by reducing distortion during cooling. Furthermore, the groove 39 may also help to reduce cooling and cycle times during such an injection molding process.

The C-shaped body 12, the rotation guide feature 16, and the cutting blade 17 may be integrally formed as a monolithic unit using conventional processes known to those of skill in the art. Of course, in other applications, each of these portions may be formed separately and then joined together.

This cable end preparation tool 10 is particularly advantageous in that it reduces the number of tools that a technician must carry and must use when preparing coaxial cables 30. Since coaxial cables 30 are often prepared in the field, this space and weight savings will be welcomed. Furthermore, such a reduction in the number of tools used to prepare the coaxial cable 30 may provide a cost savings.

Furthermore, the C-shaped body 12 also carries an optional cutting guide projection 37 adjacent the cutting blade 17 to receive a radially outer portion of the corrugated outer conductor 32 thereagainst as the C-shaped body is rotated about the rotation guide feature 16. This cutting guide projection 37 positively locate the cable end preparation tool 10 on the coaxial cable 30 while an installer is using the cutting blade 17 to remove the dielectric 34. The cutting guide projection 37 may also reform the corrugated outer conductor 32 of the coaxial cable 30 if it was deformed during cutting.

Figure 1:
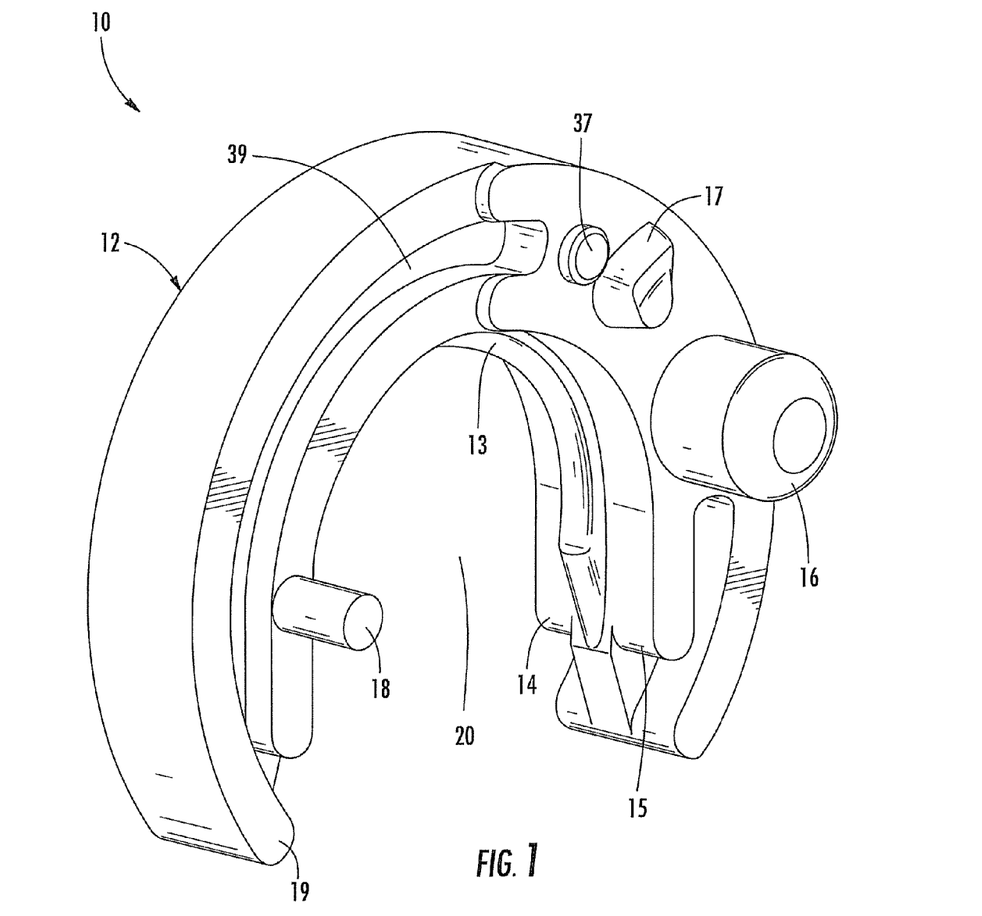
FIG. 1 is rear perspective view of a cable preparation tool in accordance with the present invention.
Figure 2:
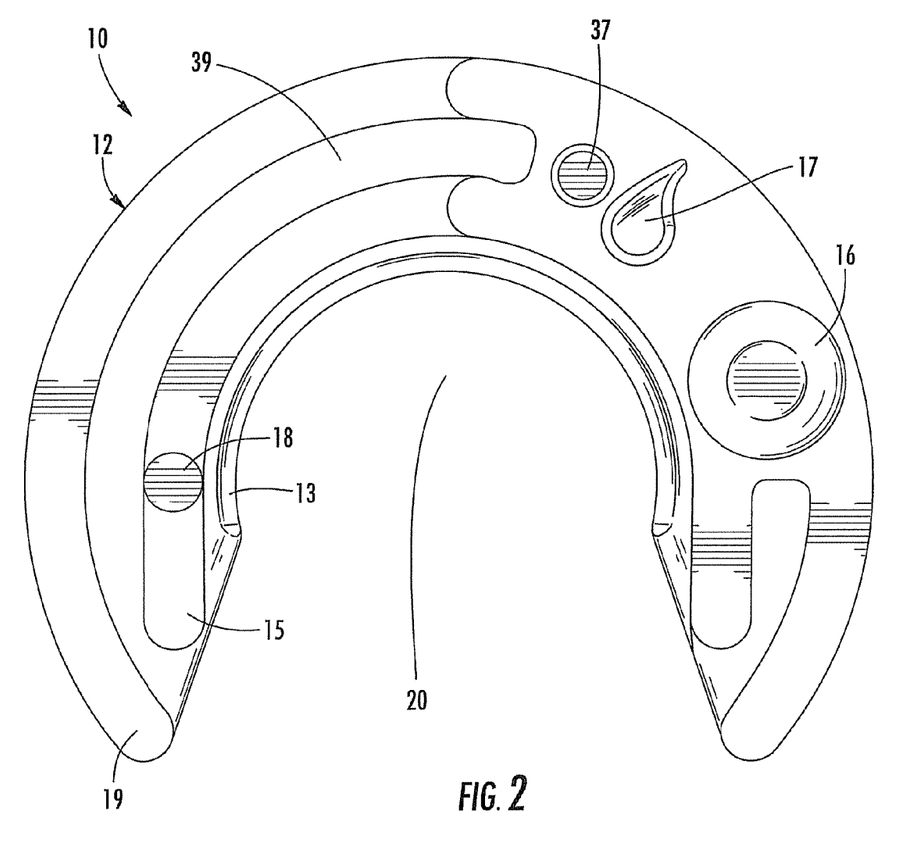
FIG. 2 is a rear elevation view of the cable end preparation tool of FIG. 1.
Figure 3:
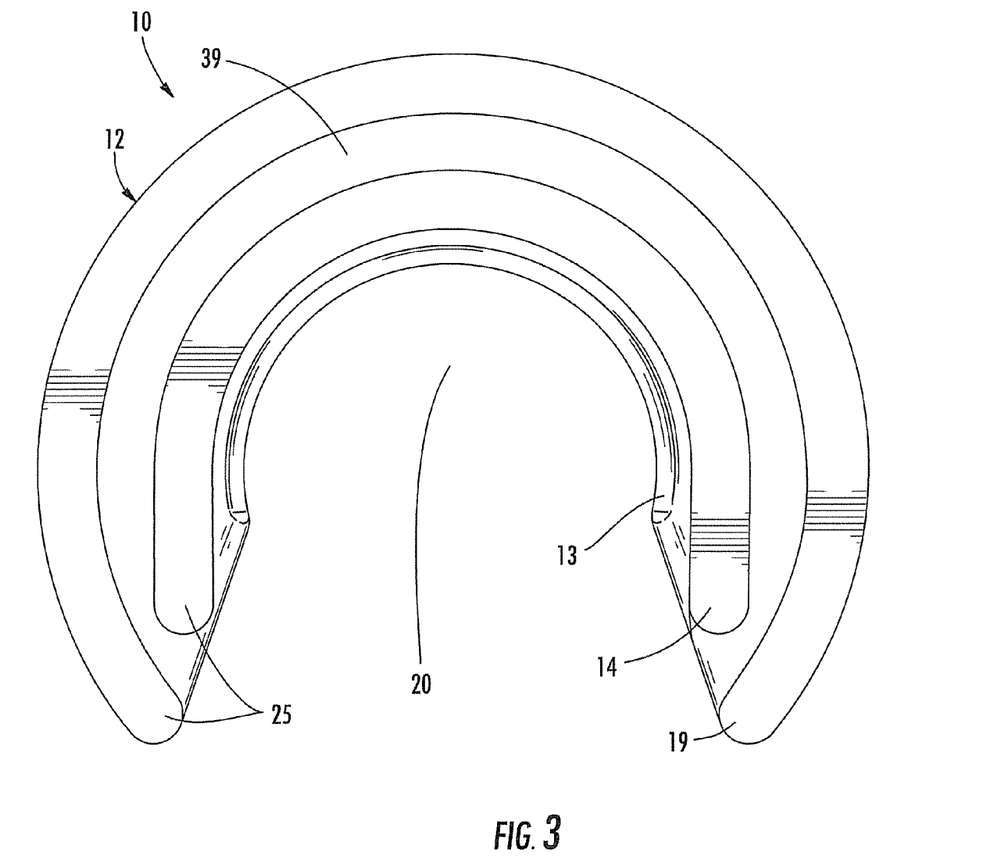
FIG. 3 is a front elevation view of the cable end preparation tool of FIG. 1.
Figure 4:
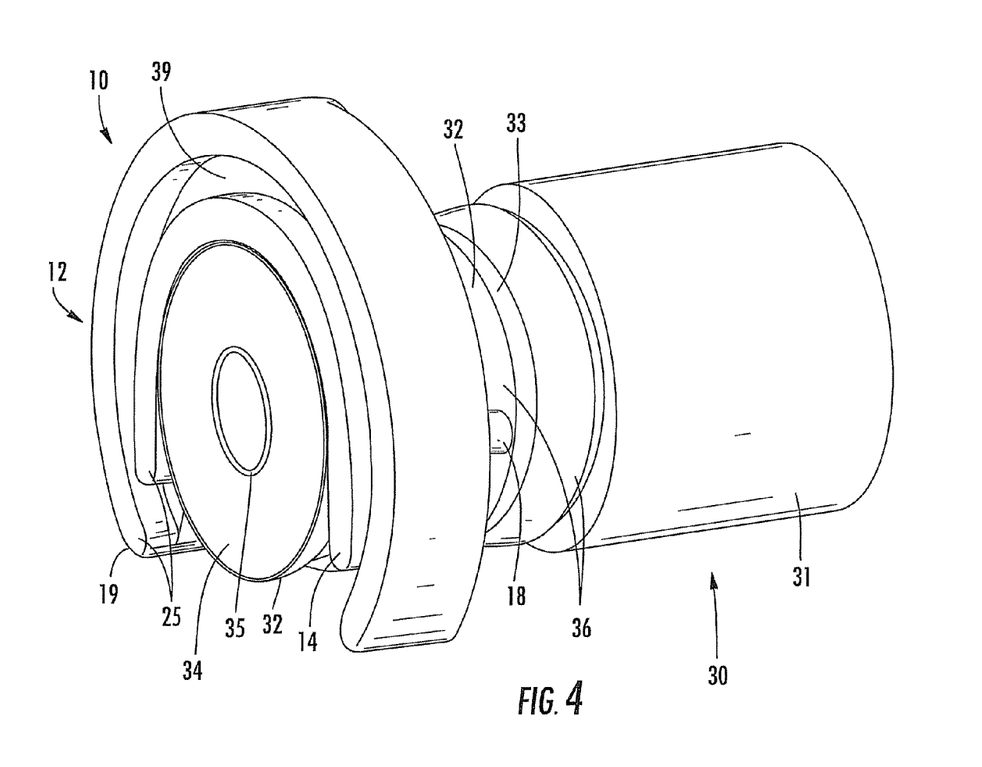
FIG. 4 is a front perspective view of the cable end preparation tool of FIG. 1 attached to a coaxial cable.
Figure 5:
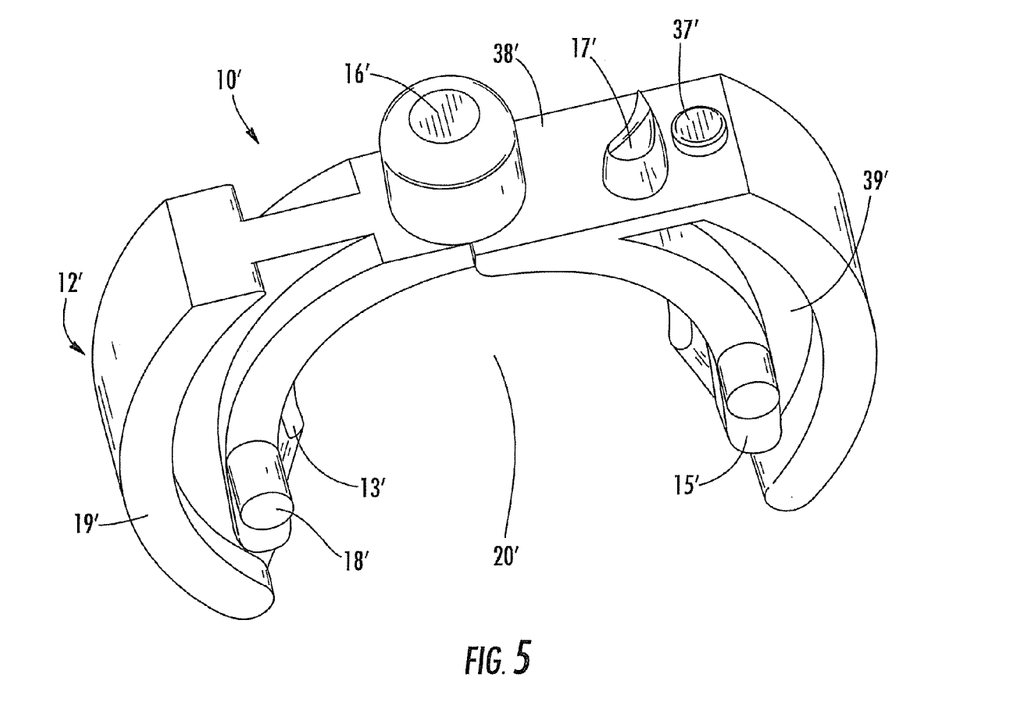
FIG. 5 is top perspective view of another embodiment of a cable end preparation tool in accordance with the present invention.

Referring now additionally to FIG. 5, another embodiment of the cable end preparation tool 10' is now described. The C-shaped body 12' defines an outer peripheral surface 38'. The rotation guide feature 16' and the cutting blade 17' are carried by the outer peripheral surface 38'. Furthermore, the outer peripheral surface 38' also carries a cutting guide projection 37' adjacent the cutting blade 17' to receive a radially outer portion of a corrugated outer conductor thereagainst as the C-shaped body 12' is rotated about the rotation guide feature 16'. This cutting guide projection 37' positively locate the cable end preparation tool 10' on an end of a coaxial cable while an installer is using the cutting blade 17' to remove the dielectric between the inner conductor and the corrugated outer conductor. The cutting guide projection 37' may also reform a corrugated outer conductor of a coaxial cable if it was deformed during cutting of the coaxial cable.

Those other elements not specifically mentioned are indicated with prime notation and are similar to the elements described above with reference to FIGS. 1-3. Accordingly, those other elements require no further description herein.

Figure 6:
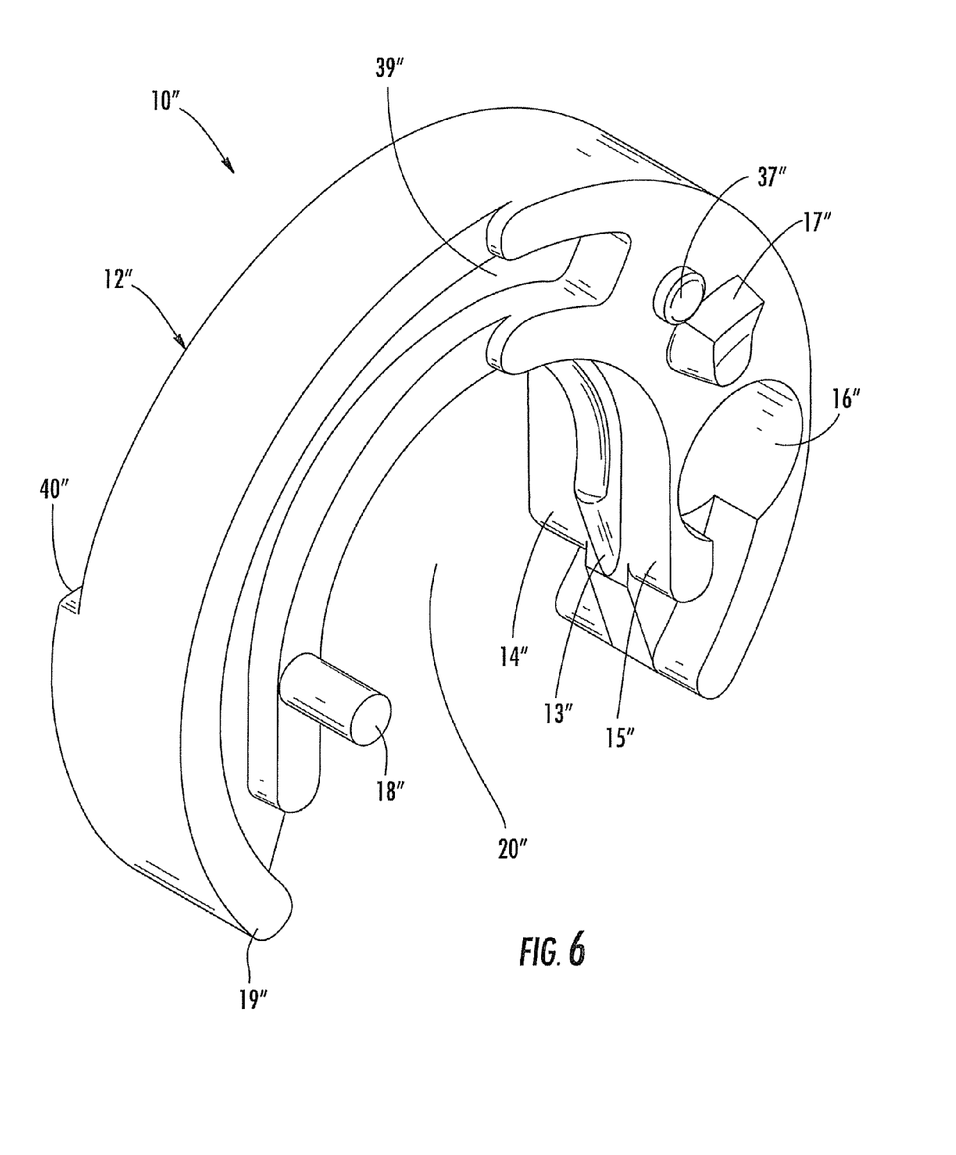
FIG. 6 is rear perspective view of yet another embodiment of a cable end preparation tool in accordance with the present invention.
Figure 7:
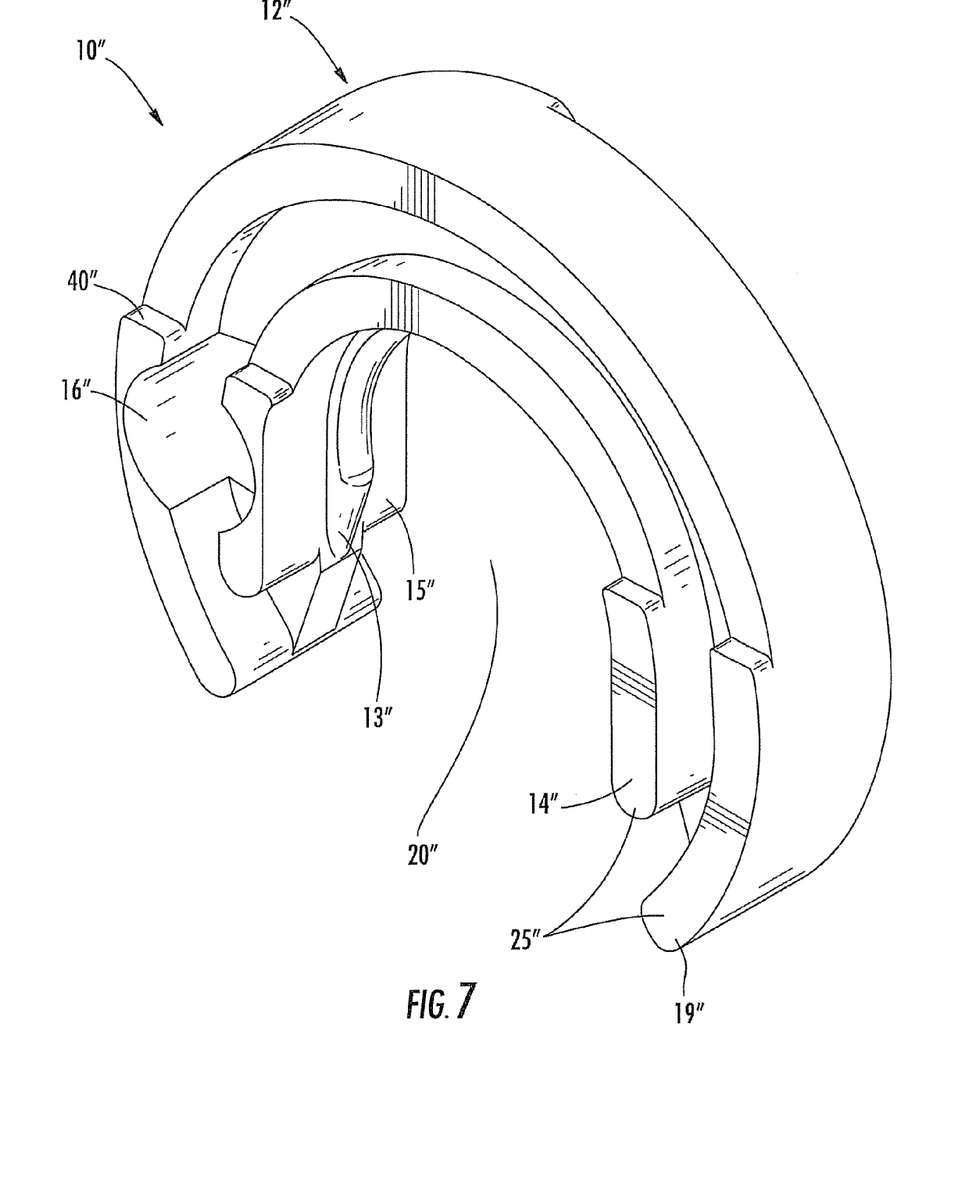
FIG. 7 is front perspective view of the cable end preparation tool of FIG. 6.

Referring now additionally to FIGS. 6-7, another embodiment of the cable end preparation tool 10" is now described. A cutting blade 17" extends outwardly from a side of the C-shaped body 12" opposite the side defining the cutting guide 25". A rotation guide feature 16" comprising a recess is defined in the C-shaped body 12" and is to receive an inner conductor. The C-shaped body 12" includes a saw stop 40" adjacent the outer guide ring 19".

The saw stop 40" protects an inner conductor from being cut by preventing a cutting blade from cutting too deeply into a coaxial cable. Of course, when using embodiments having the saw stop 40", the cable end preparation tool 10" may need to be removed from a coaxial cable, rotated 180°, and replaced on the coaxial cable before a complete cut of the corrugated outer conductor and the dielectric layer of the coaxial cable can be completed. Those skilled in the art will recognize that the saw stop 40" thus facilitates preparation of a coaxial cable end to have an outer conductor and dielectric layer cut flush with each other and an inner conductor extending therebeyond. This may facilitate installation of certain coaxial cable connectors onto the coaxial cable end.

It should also be noted that the rotation guide feature 16" may be used as an inner conductor length gage. That is, after the coaxial cable is cut, the outwardly extending portion of an inner conductor may be inserted into the rotation guide feature 16" and a portion of the inner conductor extending therebeyond may be cut. This may help technicians easily prepare a coaxial cable end to have a desired inner conductor length for use with a coaxial cable connector.

Those other elements not specifically mentioned are indicated with prime notation and are similar to the elements described above with reference to FIGS. 1-5. Accordingly, those other elements require no further description herein.

Figure 8:
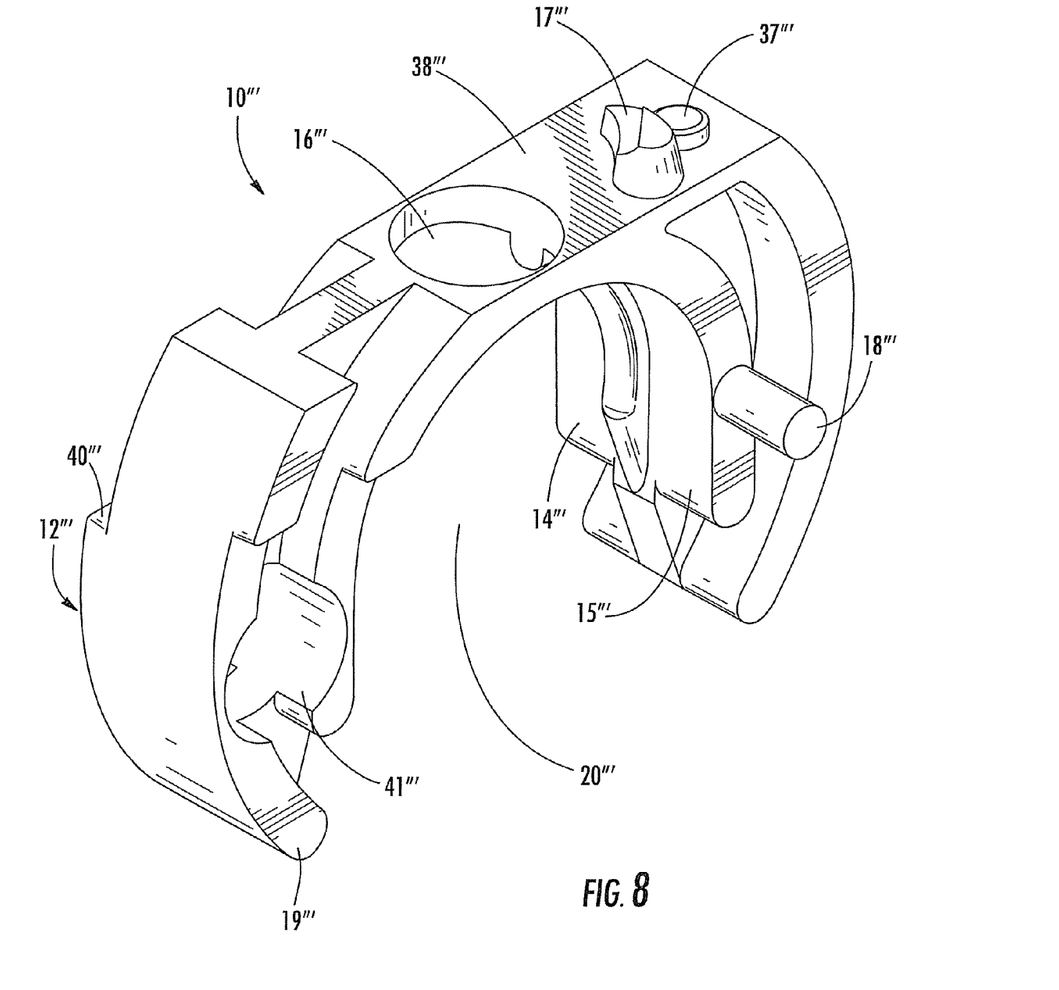
FIG. 8 is rear perspective view of still another embodiment of a cable end preparation tool in accordance with the present invention.
Figure 9:
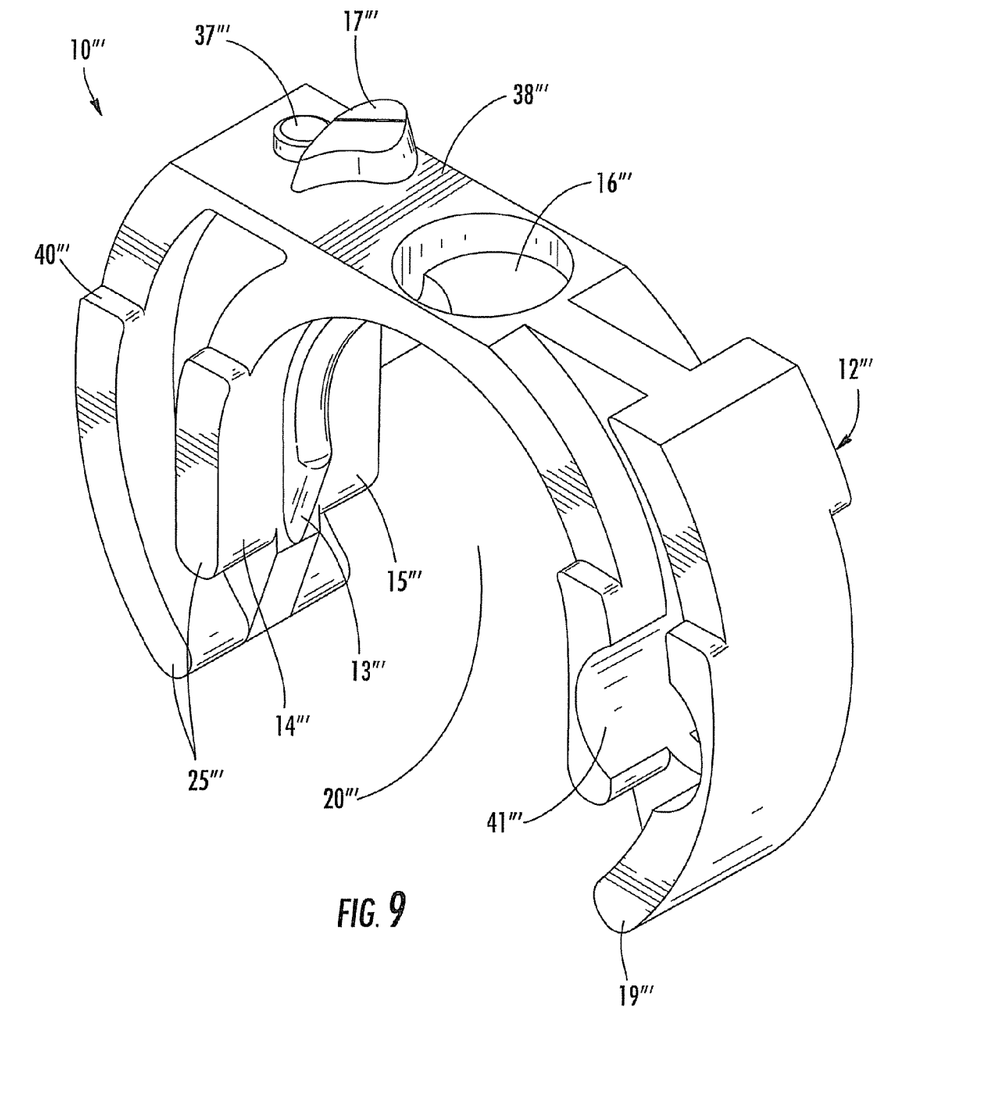
FIG. 9 is front perspective view of the cable end preparation tool of FIG. 8.

Referring now additionally to FIGS. 8-9, still another embodiment of the cable end preparation tool 10''' is now described. The C-shaped body 12''' defines an outer peripheral surface 38'''. The rotation guide feature 16''' comprises a recess defined in the outer peripheral surface 38''' to receive an inner conductor of a coaxial cable. The cutting blade 17''' is carried by the outer peripheral surface 38'''. Furthermore, the outer peripheral surface 38''' also carries a cutting guide projection 37''' adjacent the cutting blade 17''' to receive a radially outer portion of a corrugated outer conductor thereagainst as the C-shaped body 12''' is rotated about the rotation guide feature 16'''. The C-shaped body 12''' includes a saw stop 40''' adjacent the outer guide ring 19'''.

An inner conductor length gage recess 41''' is defined in the C-shaped body 12". After the coaxial cable is cut, the outwardly extending portion of an inner conductor may be inserted into the inner conductor length gage recess 41''' and a portion of the inner conductor extending therebeyond may be cut.

Those other elements not specifically mentioned are indicated with prime notation and are similar to the elements described above with reference to FIGS. 1-7. Accordingly, those other elements require no further description herein.

With reference again to FIGS. 1-5, another aspect is directed to a method of preparing a coaxial cable 30 using a cable end preparation tool 10 as described above. The method includes positioning the coaxial cable 30 in the opening 20 so that the gripping rib 13 fits in a valley 33 of the corrugated outer conductor 32, and the stabilizing rib 14 receives a crest 36 of the corrugated outer conductor 32. The coaxial cable 30 is cut using the saw guide 25. Moreover, the method includes removing a portion of the dielectric 34 between the inner conductor 35 and the corrugated outer conductor 32 with the cutting blade 17 by rotating the C-shaped body 12 about the rotation guide feature 17.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cable end preparation tool for a coaxial cable comprising an inner conductor, a dielectric layer surrounding the inner conductor, and a corrugated outer conductor surrounding the dielectric layer, the cable end preparation tool comprising:
   a C-shaped body having an opening therein to receive the coaxial cable and having a side defining a saw guide to receive a saw blade thereagainst, said C-shaped body comprising
      a gripping rib to fit in a valley of the corrugated outer conductor when the coaxial cable is in the opening,
      at least one stabilizing rib adjacent said gripping rib to receive a crest of the corrugated outer conductor thereagainst when the coaxial cable is in the opening, and
      a rotation guide feature to receive the inner conductor; and
   a cutting blade extending outwardly from said C-shaped body for removing a portion of the dielectric between the inner conductor and the corrugated outer conductor as said C-shaped body is rotated about said rotation guide feature.

2. The cable end preparation tool of claim 1 wherein said rotation guide feature comprises a projection extending outwardly from adjacent portions of said C-shaped body.

3. The cable end preparation tool of claim 1 wherein said rotation guide feature comprises a recess defined in said C-shaped body.

4. The cable end preparation tool of claim 1 wherein said cutting blade is carried by a side of the C-shaped body opposite the side defining the saw guide.

5. The cable end preparation tool of claim 1 wherein said C-shaped body defines an outer peripheral surface; wherein said cutting blade is carried by the outer peripheral surface.

6. The cable end preparation tool of claim 5 wherein said rotation guide feature comprises a recess defined in the outer peripheral surface; and further comprising an inner conductor length gage recess defined in said C-shaped body.

7. The cable end preparation tool of claim 1 further comprising a saw gage carried by said C-shaped body.

8. The cable end preparation tool of claim 1 further comprising a cutting guide projection carried by C-shaped body adjacent said cutting blade to receive a radially outer portion of the corrugated outer conductor thereagainst as said body is rotated about said rotation guide.

9. The cable end preparation tool of claim 1 wherein said C-shaped body further comprises an outer guide ring adjacent said at least one stabilizing rib.

10. The cable end preparation tool of claim 9 wherein said C-shaped body further comprises a saw stop adjacent said outer guide ring.

11. The cable end preparation tool of claim 1 wherein the opening of said C-shaped body comprises a partial circular opening extending more than 180° degrees.

12. The cable end preparation tool of claim 1 wherein said C-shaped body, said gripping rib, said stabilizing rib, said rotation guide feature, and said cutting blade are integrally formed as a monolithic unit.

13. A cable end preparation tool for a coaxial cable comprising an inner conductor, a dielectric layer surrounding the inner conductor, and a corrugated outer conductor surrounding the dielectric layer, the cable end preparation tool comprising:

a C-shaped body defining an outer peripheral surface, having an opening therein to receive the coaxial cable, and having a side defining a saw guide to receive a saw blade thereagainst, said C-shaped body comprising
- a gripping rib to fit in a valley of the corrugated outer conductor when the coaxial cable is in the opening,
- at least one stabilizing rib adjacent said gripping rib to receive a crest of the corrugated outer conductor thereagainst when the coaxial cable is in the opening,
- an outer guide ring adjacent said at least one stabilizing rib, and
- a rotation guide feature to receive the inner conductor; and a cutting blade extending outwardly from the outer peripheral surface for removing a portion of the dielectric between the inner conductor and the corrugated outer conductor as said C-shaped body is rotated about said rotation guide feature.

14. The cable end preparation tool of claim 13 wherein said rotation guide feature comprises a projection extending outwardly from adjacent portions of the outer peripheral surface.

15. The cable end preparation tool of claim 13 wherein said rotation guide feature comprises a recess defined in the outer peripheral surface.

16. The cable end preparation tool of claim 13 wherein said C-shaped body further comprises a saw stop adjacent said outer guide ring.

17. The cable end preparation tool of claim 13 further comprising an inner conductor length gage recess defined in said C-shaped body.

18. The cable end preparation tool of claim 13 further comprising a cutting guide projection carried by the outer peripheral surface adjacent said cutting blade to receive a radially outer portion of the corrugated outer conductor thereagainst as said body is rotated about said rotation guide.

* * * * *